United States Patent
Hart et al.

(10) Patent No.: US 7,766,784 B2
(45) Date of Patent: Aug. 3, 2010

(54) EIGHT SPEED AUTOMATIC TRANSMISSION

(75) Inventors: James M. Hart, Belleville, MI (US);
Scott H. Wittkopp, Ypsilanti, MI (US);
Andrew W. Phillips, Saline, MI (US);
Clinton E. Carey, Monroe, MI (US);
Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 368 days.

(21) Appl. No.: 12/032,860

(22) Filed: Feb. 18, 2008

(65) Prior Publication Data
US 2008/0242486 A1   Oct. 2, 2008

Related U.S. Application Data

(60) Provisional application No. 60/909,614, filed on Apr. 2, 2007.

(51) Int. Cl.
*F16H 3/62* (2006.01)
(52) U.S. Cl. .................. 475/275; 475/311; 475/323; 475/330
(58) Field of Classification Search ............ 475/269, 475/275, 311, 323, 330
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0242487 A1* | 10/2008 | Hart et al. | 475/276 |
| 2008/0242495 A1* | 10/2008 | Wittkopp et al. | 475/282 |
| 2008/0242496 A1* | 10/2008 | Phillips et al. | 475/288 |

* cited by examiner

*Primary Examiner*—David D Le (57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may include clutches and a brake.

31 Claims, 6 Drawing Sheets

| GEAR STATE | GEAR RATIO | RATIO STEP | TORQUE TRANSMITTING ELEMENTS ||||| 
|---|---|---|---|---|---|---|---|
| | | | 34 | 32 | 30 | 28 | 26 |
| REV | -2.465 | | X | X | | | X |
| N | | -0.65 | O | O | | | |
| 1st | 3.804 | | X | X | | X | |
| 2nd | 2.652 | 1.43 | X | X | X | | |
| 3rd | 1.844 | 1.44 | | X | X | X | |
| 4th | 1.561 | 1.18 | | X | X | | X |
| 5th | 1.318 | 1.18 | | X | | X | X |
| 6th | 1.000 | 1.32 | | | X | X | X |
| 7th | 0.762 | 1.31 | X | | | X | X |
| 8th | 0.623 | 1.22 | X | | X | | X |

X = ENGAGED, CARRYING TORQUE
O = ENGAGED, NOT CARRYING TORQUE

| GEAR STATE | GEAR RATIO | RATIO STEP | TORQUE TRANSMITTING ELEMENTS ||||| 
|---|---|---|---|---|---|---|---|
| | | | 134 | 132 | 126 | 128 | 130 |
| REV | -2.400 | | X | X | | | X |
| N | | -0.52 | O | O | | | |
| 1st | 4.600 | | X | X | X | | |
| 2nd | 3.067 | 1.50 | X | X | | X | |
| 3rd | 2.421 | 1.27 | | X | X | X | |
| 4th | 2.000 | 1.21 | | X | | X | X |
| 5th | 1.450 | 1.38 | | X | X | | X |
| 6th | 1.000 | 1.45 | | | X | X | X |
| 7th | 0.820 | 1.22 | X | | X | | X |
| 8th | 0.667 | 1.23 | X | | | X | X |

X = ENGAGED, CARRYING TORQUE
O = ENGAGED, NOT CARRYING TORQUE

| GEAR STATE | GEAR RATIO | RATIO STEP | TORQUE TRANSMITTING ELEMENTS ||||| 
|---|---|---|---|---|---|---|---|
| | | | 234 | 226 | 232 | 228 | 230 |
| REV | -1.501 | | X | X | X | | |
| N | | -0.35 | O | O | | | |
| 1st | 4.329 | | X | X | | X | |
| 2nd | 2.726 | 1.59 | X | X | | | X |
| 3rd | 1.882 | 1.45 | | X | | X | X |
| 4th | 1.618 | 1.16 | | X | X | | X |
| 5th | 1.370 | 1.18 | | X | X | X | |
| 6th | 1.000 | 1.37 | | | X | X | X |
| 7th | 0.710 | 1.41 | X | | X | X | |
| 8th | 0.580 | 1.22 | X | | X | | X |

X = ENGAGED, CARRYING TORQUE
O = ENGAGED, NOT CARRYING TORQUE

FIG. 9

EIGHT SPEED AUTOMATIC TRANSMISSION

CROSS-REFERENCE TO RELATED APPLICATIONS

This application claims the benefit of U.S. Provisional Application No. 60/909,614 filed on Apr. 2, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided having an input member, an output member, four planetary gear sets, a plurality of coupling members and a plurality of torque transmitting devices. Each of the planetary gear sets includes first, second and third members. The torque transmitting devices may be either clutches or a brake.

An embodiment of the transmission includes two simple planetary gear sets and two compound planetary gear sets, four clutches and one brake.

Another embodiment of the transmission includes four simple planetary gear sets, four clutches and one brake.

Another embodiment of the transmission includes three simple planetary gear sets and one compound planetary gear set, four clutches and one brake.

It is thus an object of the present invention to provide an automatic transmission having four planetary gear sets.

It is a further object of the present invention to provide an automatic transmission having at least eight forward speeds and at least one reverse.

It is a still further object of the present invention to provide an automatic transmission having four planetary gear sets, a plurality of coupling members and a plurality of torque transmitting devices.

It is still a further object of the present invention that each carrier member can be either a single-pinion carrier member (simple) or a double-pinion carrier member (compound). Embodiments with long pinions are also possible.

It is a still further object of the present invention to provide an automatic transmission having four planetary gear sets, a plurality of coupling members and a plurality of clutches and a brake.

It is a still further object of the present invention to provide an automatic transmission having two compound planetary gear sets and two simple planetary gear sets.

Further objects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These permanent mechanical connections relate the transmission embodiments. A first component or element of a first planetary gear set is permanently coupled to a first component or element of a second planetary gear set. A second component or element of the first planetary gear set is permanently coupled to a second component or element of the second planetary gear set. The second component or element of the second planetary gear set is also permanently coupled to a second component or element of a third planetary gear set. A third component or element of the third planetary gear set is permanently coupled to a ground, stationary element, or a transmission housing.

Figure 1:
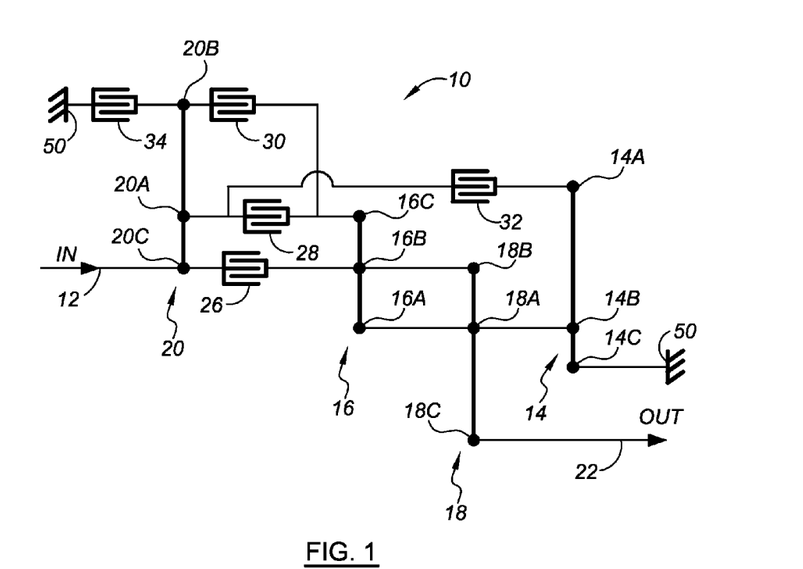
FIG. 1 is a lever diagram of an embodiment of an eight speed automatic transmission according to the present invention.

Referring now to FIG. 1, an embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, which is hereby fully incorporated by reference.

The automatic transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The second node 14B of the first planetary gear set 14 is coupled to the first node 18A of the third planetary gear set 18. The third node 14C of the first planetary gear set 14 is coupled to ground or the transmission housing 50. The first node 16A of the second planetary gear set 16 is coupled to first node 18A of the third planetary gear set 18. The second node 16B of the second planetary gear set 16 is coupled to second node 18B of the third planetary gear set 18. The third node 20C of the fourth planetary gear set 20 is coupled to the input shaft or member 12. The output shaft or member 22 is coupled to the third node 18C of the third planetary gear set 18.

A first clutch 26 selectively connects the second node 16B of the second planetary gear set 16 to the third node 20C of the fourth planetary gear set 20. A second clutch 28 selectively connects the third node 16C of the second planetary gear set 16 to the first node 20A of the fourth planetary gear set 20. A third clutch 30 selectively connects the third node 16C of the second planetary gear set 16 to the second node 20B of the fourth planetary gear set 20. A fourth clutch 32 selectively connects the first node 20A of the fourth planetary gear set 20 to the first node 14A of the first planetary gear set 14. A brake 34 selectively connects the second node 20B of the fourth planetary gear set 20 to the ground or transmission housing 50.

Figure 2:
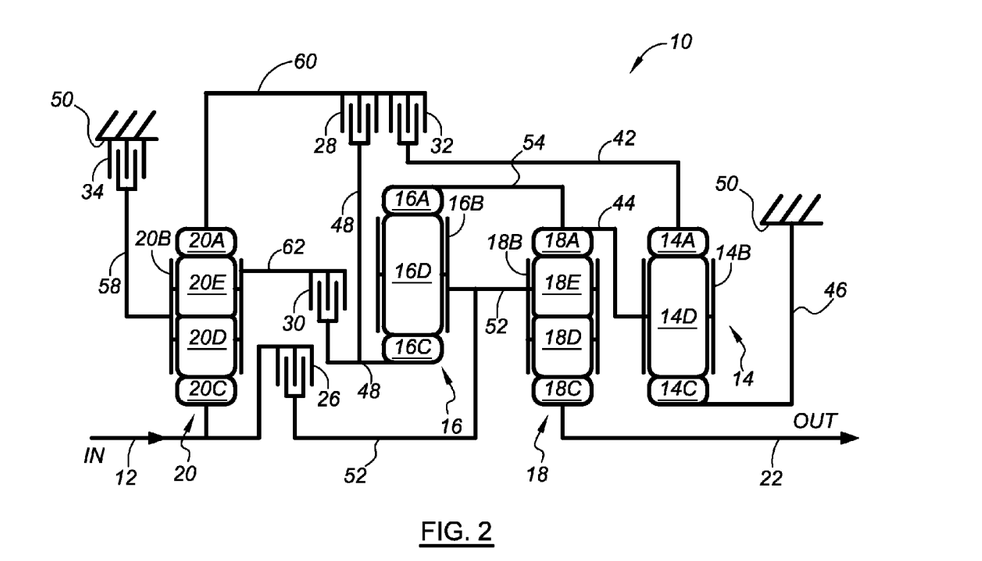
FIG. 2 is a diagrammatic view of an embodiment of an eight speed automatic transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

For example, planetary gear set 14 includes a ring gear member 14A, a planet gear carrier member 14B and a sun gear member 14C. Ring gear member 14A is connected for common rotation with a first interconnecting shaft or member 42. The planet gear carrier member 14B rotatably supports a set of planet gears 14D (only one shown) and is connected for common rotation with a second interconnecting shaft or member 44. The sun gear member 14C is connected to the ground or transmission housing 50 through a third shaft or interconnecting member 46. Planet gears 14D are each configured to intermesh with sun gear member 14C and ring gear member 14A.

The input shaft or member 12 is continuously connected to an engine (not shown) or to a turbine of a torque converter (not shown). The output shaft or member 22 is continuously connected with the final drive unit or transfer case (not shown).

Planetary gear set 16 includes a sun gear member 16C, a planet carrier member 16B that rotatably supports a set of planet gears 16D and a ring gear member 16A. Sun gear member 16C is connected for common rotation with a fourth interconnecting shaft or member 48. Planet carrier member 16B is connected for common rotation with a fifth interconnecting shaft or member 52. Ring gear member 16A is connected for common rotation with a sixth interconnecting shaft or member 54. Planet gears 16D are each configured to intermesh with both sun gear member 16C and ring gear member 16A.

Planetary gear set 18 includes a sun gear member 18C, a ring gear member 18A and a planet carrier member 18B that rotatably supports a first set of planet gears 18D and a second set of planet gears 18E. Sun gear member 18C is connected for common rotation with output shaft or member 22. Ring gear member 18A is connected for common rotation with second interconnecting shaft or member 44 and sixth interconnecting shaft or member 54. Planet carrier member 18B is connected for common rotation with fifth interconnecting shaft or member 52. First set of planet gears 18D are configured to intermesh with both sun gear member 18C and second set of planet gears 18E. Second set of planet gears 18E are configured to intermesh with both ring gear member 18A and first set of planet gears 18D.

Planetary gear set 20 includes a sun gear member 20C, a ring gear member 20A and a planet carrier member 20B that rotatably supports a first set of planet gears 20D and a second set of planet gears 20E. Sun gear member 20C is connected for common rotation with the input shaft or member 12. Ring gear member 20A is connected for common rotation with a seventh interconnecting shaft or member 60. Planet carrier member 20B is connected for common rotation with an eighth interconnecting shaft or member 62 and a ninth interconnecting shaft or member 58. First set of planet gears 20D are configured to intermesh with both sun gear member 20C and second set of planet gears 20E. Second set of planet gears 20E are configured to intermesh with both ring gear member 20A and first set of planet gears 20D.

The torque-transmitting mechanisms or clutches 26, 28, 30, 32 and brake 34 allow for selective interconnection of the shafts or interconnecting members, members of the planetary gear sets and the housing. For example, first clutch 26 is selectively engageable to connect input shaft or member 12 to fifth interconnecting shaft or member 52. Second clutch 28 is selectively engageable to connect seventh interconnecting shaft or member 60 to fourth interconnecting shaft or member 48. Third clutch 30 is selectively engageable to connect eighth interconnecting shaft or member 62 to fourth interconnecting shaft or member 48. Fourth clutch 32 is selectively engageable to connect seventh interconnecting shaft or member 60 to first interconnecting shaft or member 42. Brake 34 is selectively engageable to connect ninth interconnecting shaft or member 58 to transmission housing 50 to restrict rotation of shaft or member 58 relative to housing 50.

Figure 3:
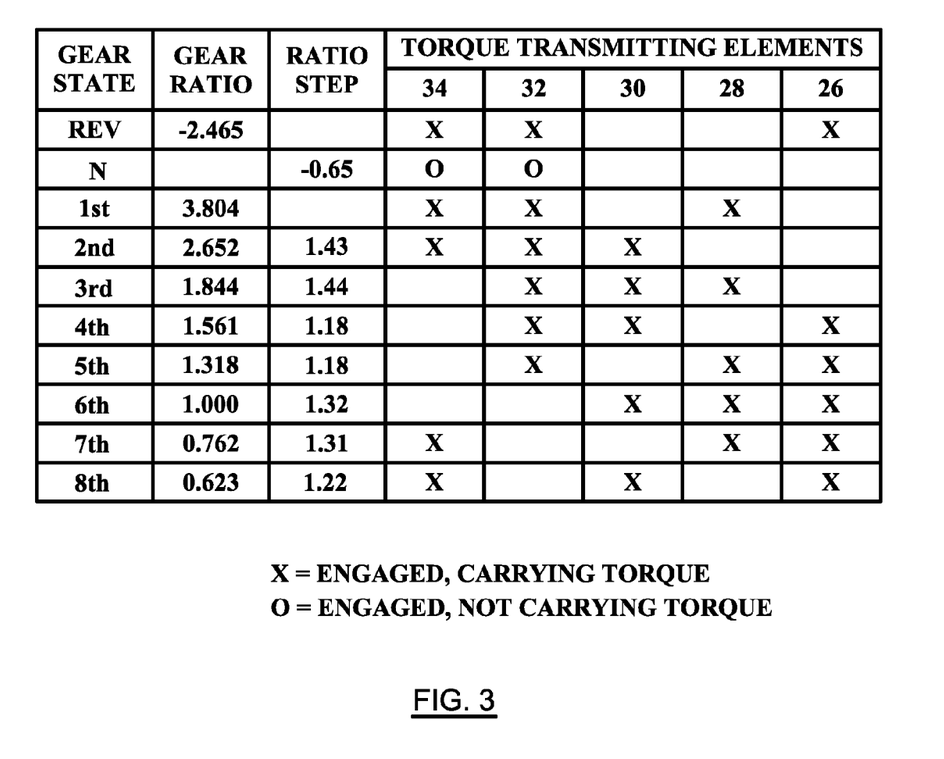
FIG. 3 is a truth table presenting the state of engagement of the various torque transmitting clutches and brakes in each of the available forward and reverse speeds or gear ratios of the automatic transmission illustrated in FIGS. 1 and 2.

Referring now to FIGS. 2 and 3, the operation of the embodiment of the eight speed automatic transmission 10 will be described. It will be appreciated that the automatic transmission 10 is capable of transmitting torque from the input shaft or member 12 to the output shaft or member 22 in at least eight forward speed or torque ratios and at least one reverse speed or torque ratio. Each forward and reverse speed or torque ratio is attained by engagement of one or more of the torque-transmitting mechanisms (i.e. first clutch 26, second clutch 28, third clutch 30, fourth clutch 32 and brake 34), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, first clutch 26, fourth clutch 32 and brake 34, and are engaged or activated. First clutch 26 connects input shaft or member 12 to fifth interconnecting shaft or member 52. Fourth clutch 32 connects seventh interconnecting shaft or member 60 to first interconnecting shaft or member 42. Brake 34 connects ninth interconnecting shaft or member 58 to transmission housing 50 to restrict rotation of shaft or member 58 relative to housing 50. Likewise, the eight forward ratios are achieved through different combinations of clutch engagement, as shown in FIG. 3.

It will be appreciated that the foregoing explanation of operation and gear states of the eight speed automatic transmission 10 assumes, first of all, that all clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 4:
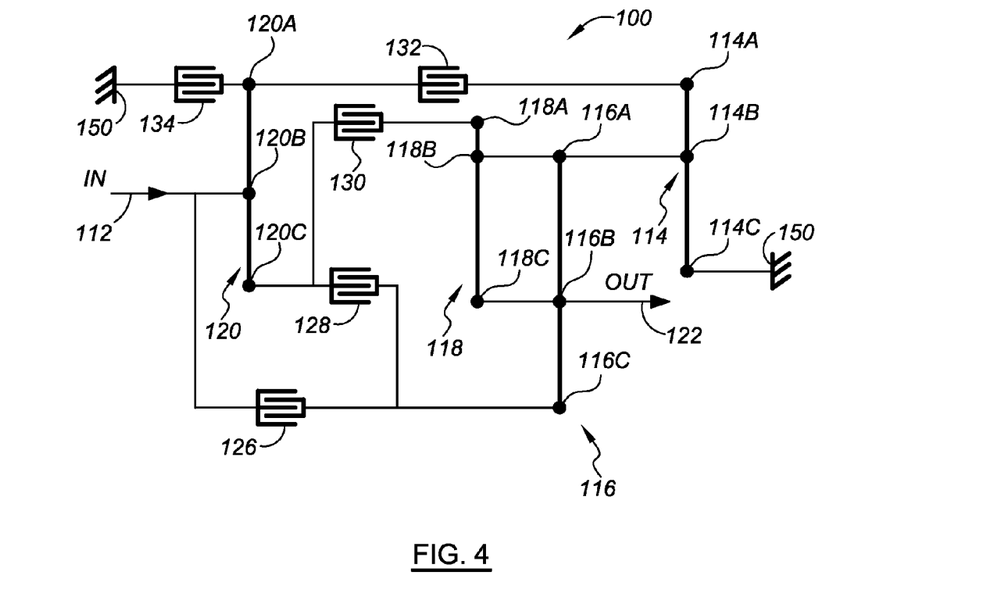
FIG. 4 is a lever diagram of another embodiment of an eight speed automatic transmission according to the present invention.

Referring now to FIG. 4, another embodiment of an automatic transmission is illustrated and indicated by reference number 100. Automatic transmission 100 includes an input shaft or member 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122.

The second node 114B of the first planetary gear set 114 is coupled to the first node 116A of the second planetary gear set 116. The third node 114C of the first planetary gear set 114 is coupled to ground or the transmission housing 150. The first node 116A of the second planetary gear set 116 is coupled to the second node 118B of the third planetary gear set 118. The second node 116B of the second planetary gear set 116 is coupled to the third node 118C of the third planetary gear set 118. The second node 120B of the fourth planetary gear set 120 is coupled to the input shaft or member 112. The output shaft or member 122 is coupled to the second node 116B of the second planetary gear set 116.

A first clutch 126 selectively connects the third node 116C of the second planetary gear set 116 to the second node 120B of the fourth planetary gear set 120 and the input shaft 112. A second clutch 128 selectively connects the third node 116C of the second planetary gear set 116 to the third node 120C of the fourth planetary gear set 120. A third clutch 130 selectively connects the first node 118A of the third planetary gear set 118 to the third node 120C of the fourth planetary gear set 120. A fourth clutch 132 selectively connects the first node 120A of the fourth planetary gear set 120 to the first node 114A of the first planetary gear set 114. A brake 134 selectively connects the first node 120A of the fourth planetary gear set 120 to the ground or transmission housing 150.

Figure 5:
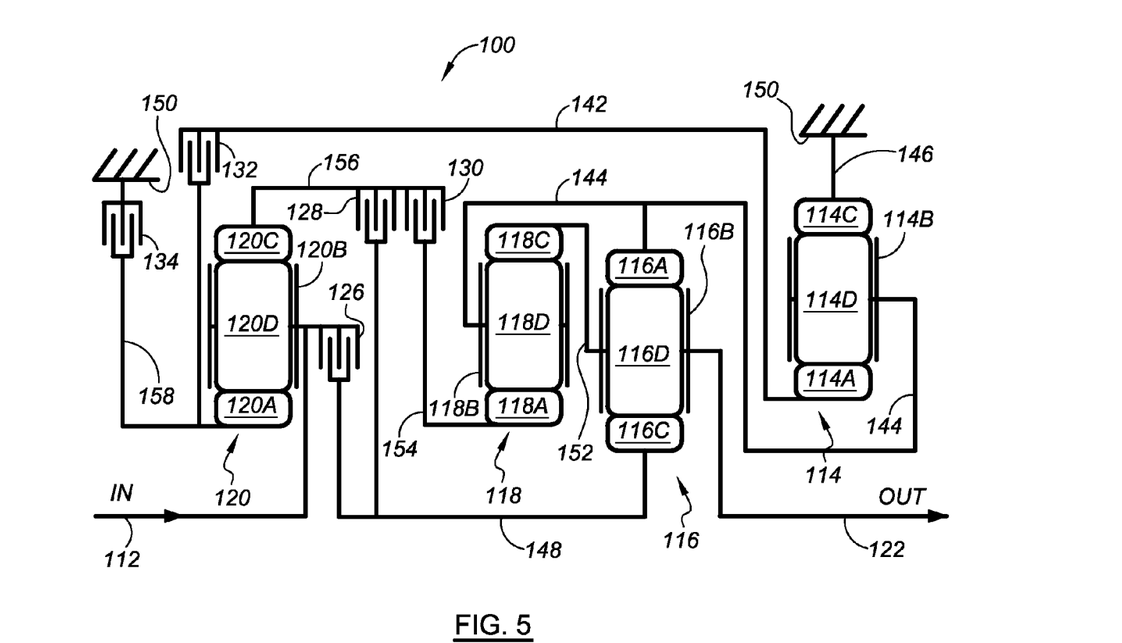
FIG. 5 is a diagrammatic view of another embodiment of an eight speed automatic transmission according to the present invention.

Referring now to FIG. 5, a stick diagram presents a schematic layout of the embodiment of the eight speed transmission 100 according to the present invention. In FIG. 5, the numbering from the lever diagram of FIG. 4 is carried over. The clutches, brake and couplings are correspondingly presented whereas the nodes of the planetary gear sets now appear as components of planetary gear sets such as sun gears, ring gears, planet gears and planet gear carriers.

For example, planetary gear set 114 includes sun gear member 114A, planet gear carrier member 114B and ring gear member 114C. Sun gear member 114A is connected for common rotation with a first interconnecting shaft or member 142. The planet gear carrier member 114B rotatably supports a set of planet gears 114D (only one shown) and is connected for common rotation with a second interconnecting shaft or member 144. Planet gears 114D are each configured to intermesh with sun gear member 114A and ring gear member 114C. Ring gear member 114C is connected to the ground or transmission housing 150 through a third interconnecting shaft or member 146.

The input shaft or member 112 is continuously connected to an engine (not shown) or to a turbine of a torque converter (not shown). The output shaft or member 122 is continuously connected with the final drive unit or transfer case (not shown).

Planetary gear set 116 includes sun gear member 116C, planet carrier member 116B that rotatably supports a set of planet gears 116D and ring gear member 116A. Sun gear member 116C is connected for common rotation with a fourth interconnecting shaft or member 148. Planet carrier member 116B is connected for common rotation with a fifth interconnecting shaft or member 152 and output shaft or member 122. Planet gears 116D are each configured to intermesh with both sun gear member 116C and ring gear member 116A. Ring gear member 116A is connected for common rotation with the second interconnecting shaft or member 144.

Planetary gear set 118 includes sun gear member 118A, ring gear member 118C and planet carrier member 118B that rotatably supports a set of planet gears 118D. Sun gear member 118A is connected for common rotation with a sixth interconnecting shaft or member 154. Ring gear member 118C is connected for common rotation with fifth interconnecting shaft or member 152. Planet carrier member 118B is connected for common rotation with second interconnecting shaft or member 144. Planet gears 118D are each configured to intermesh with both sun gear member 118A and ring gear member 118C.

Planetary gear set 120 includes sun gear member 120A, ring gear member 120C and planet carrier member 120B that rotatably supports a set of planet gears 120D. Sun gear member 120A is connected for common rotation with a seventh interconnecting shaft or member 158. Ring gear member 120C is connected for common rotation with an eighth interconnecting shaft or member 156. Planet carrier member 120B is connected for common rotation with input shaft or member 112. Planet gears 120D are each configured to intermesh with both sun gear member 120A and ring gear member 120C.

The torque-transmitting mechanisms or clutches 126, 128, 130, 132 and brake 134 allow for selective interconnection of the shafts or interconnecting members, members of the planetary gear sets and the housing. For example, first clutch 126 is selectively engageable to connect input shaft or member 112 and planet carrier member 120B to fourth interconnecting shaft or member 148. Second clutch 128 is selectively engageable to connect eighth interconnecting shaft or member 156 to fourth interconnecting shaft or member 148. Third clutch 130 is selectively engageable to connect eighth interconnecting shaft or member 156 to sixth interconnecting shaft or member 154. Fourth clutch 132 is selectively engageable to connect first interconnecting shaft or member 142 to seventh interconnecting shaft or member 158. Brake 134 is selectively engageable to connect seventh interconnecting shaft or member 158 to transmission housing 150 to restrict rotation of shaft or member 158 relative to housing 150.

Figure 6:
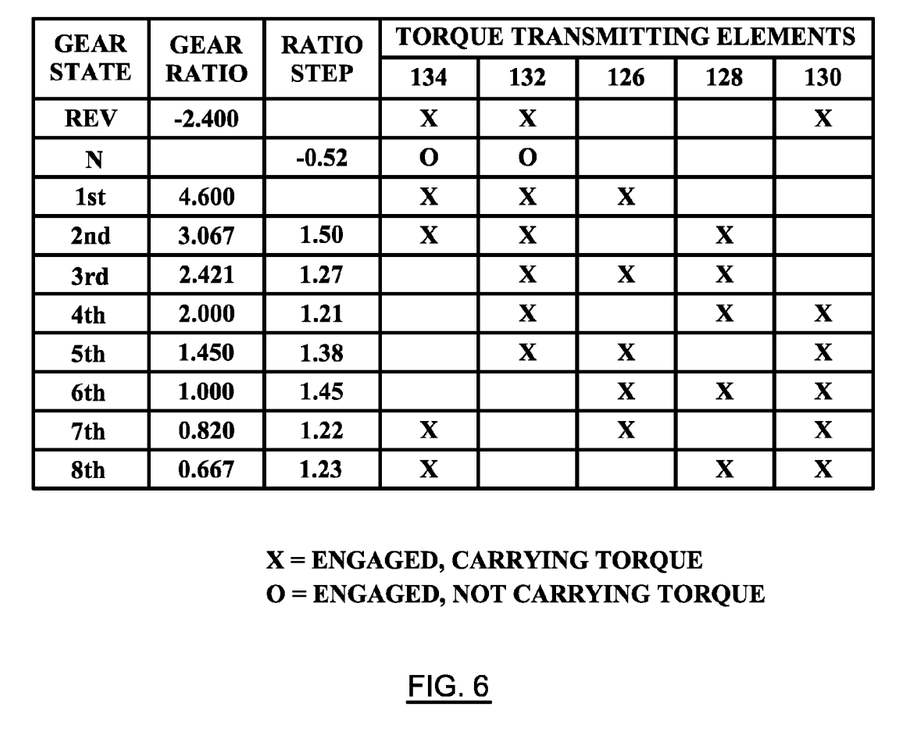
FIG. 6 is a truth table presenting the state of engagement of the various torque transmitting clutches and brakes in each of the available forward and reverse speeds or gear ratios of the automatic transmission illustrated in FIGS. 4 and 5.

Referring now to FIGS. 5 and 6, the operation of the embodiment of the eight speed automatic transmission 100 will be described. It will be appreciated that the automatic transmission 100 is capable of transmitting torque from the input shaft or member 112 to the output shaft or member 122 in at least eight forward speed or torque ratios and at least one reverse speed or torque ratio. Each forward and reverse speed or torque ratio is attained by engagement of one or more of the torque-transmitting mechanisms (i.e. first clutch 126, second clutch 128, third clutch 130, fourth clutch 132 and brake 134), as will be explained below. FIG. 6 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100. An example of the gear ratios that may be obtained using the embodiments of the present invention are also shown in FIG. 6. Of course, other gear ratios are achievable depending on the gear diameter, gear teeth count and gear configuration selected.

To establish reverse gear, third clutch 130, fourth clutch 132 and brake 134, and are engaged or activated. Third clutch 130 connects eighth interconnecting shaft or member 156 to sixth interconnecting shaft or member 154. Fourth clutch 132 connects first interconnecting shaft or member 142 to seventh interconnecting shaft or member 158. Brake 134 connects seventh interconnecting shaft or member 158 to transmission housing 150 to restrict rotation of shaft or member 158 relative to housing 150. Likewise, the eight forward ratios are achieved through different combinations of clutch engagement, as shown in FIG. 6.

It will be appreciated that the foregoing explanation of operation and gear states of the eight speed automatic transmission 100 assumes, first of all, that all clutches and brake not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 7:
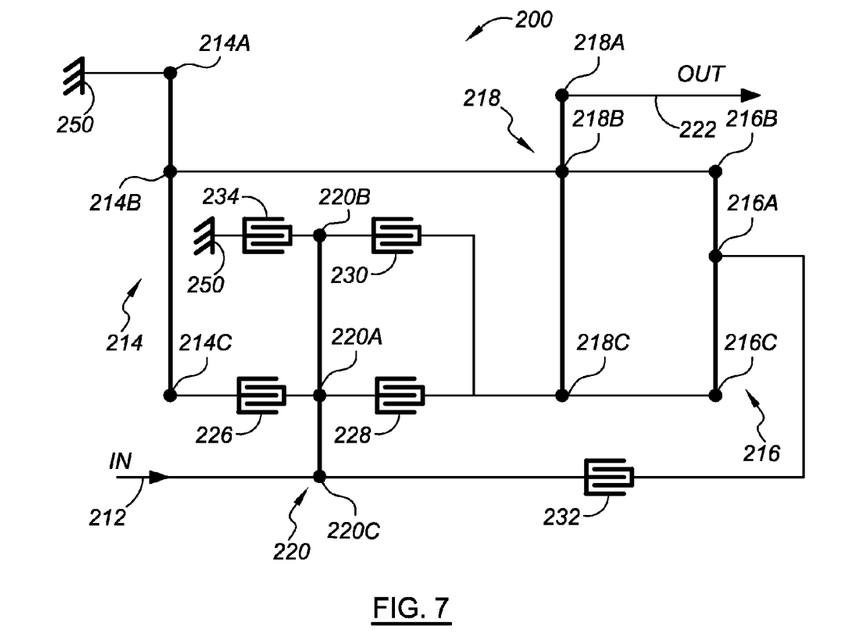
FIG. 7 is a lever diagram of another embodiment of an eight speed automatic transmission according to the present invention.

Referring now to FIG. 7, another embodiment of an automatic transmission is illustrated and indicated by reference number 200. Automatic transmission 200 includes an input shaft or member 212, a first planetary gear set 214 having three nodes: a first node 214A, a second node 214B and a third node 214C, a second planetary gear set 216 having three nodes: a first node 216A, a second node 216B and a third node 216C, a third planetary gear set 218 having three nodes: a first node 218A, a second node 218B and a third node 218C, a fourth planetary gear set 220 having three nodes: a first node 220A, a second node 220B and a third node 220C and an output shaft or member 222.

The first node 214A of the first planetary gear set 214 is coupled to ground or the transmission housing 250. The second node 214B of the first planetary gear set 214 is coupled to the second node 218B of the third planetary gear set 218. The second node 216B of the second planetary gear set 216 is coupled to the second node 218B of the third planetary gear set 218. The third node 216C of the second planetary gear set 216 is coupled to third node 218C of the third planetary gear set 218. The first node 218A of the third planetary gear set 218 is coupled to the output shaft or member 222. The input shaft or member 212 is coupled to the third node 220C of the fourth planetary gear set 220.

A first clutch 226 selectively connects the third node 214C of the first planetary gear set 214 to the first node 220A of the fourth planetary gear set 220. A second clutch 228 selectively connects the third node 218C of the third planetary gear set 218 to the first node 220A of the fourth planetary gear set 220. A third clutch 230 selectively connects the third node 218C of the third planetary gear set 218 to the second node 220B of the fourth planetary gear set 220. A fourth clutch 232 selectively connects the third node 220C of the fourth planetary gear set 220 to the first node 216A of the second planetary gear set 116. A brake 234 selectively connects the second node 220B of the fourth planetary gear set 220 to the ground or transmission housing 250.

Figure 8:
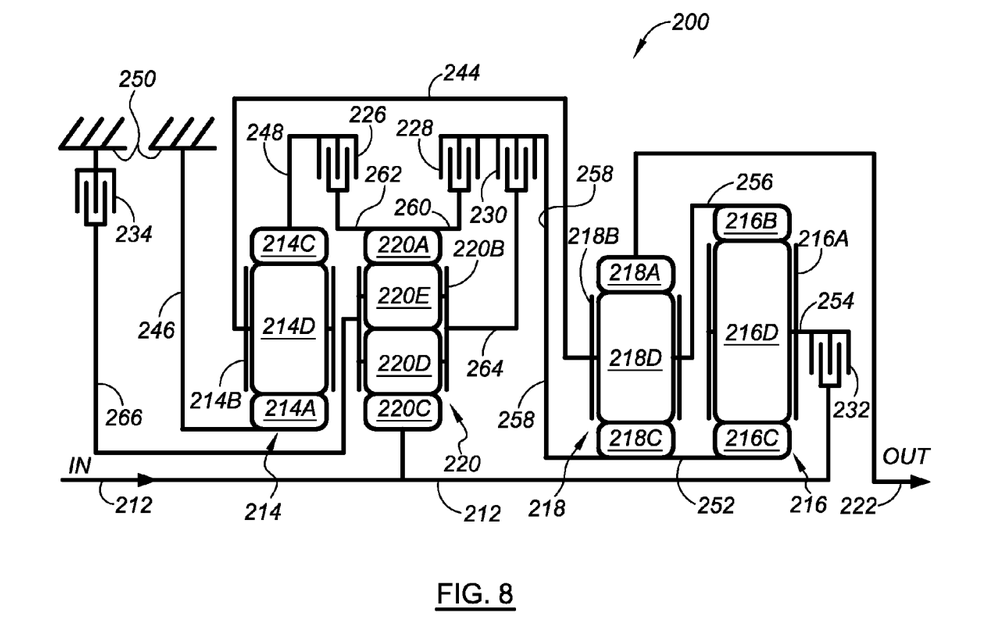
FIG. 8 is a diagrammatic view of another embodiment of an eight speed automatic transmission according to the present invention.

Referring now to FIG. 8, a stick diagram presents a schematic layout of the embodiment of the eight speed transmission 200 according to the present invention. In FIG. 8, the numbering from the lever diagram of FIG. 7 is carried over. The clutches, brake and couplings are correspondingly presented whereas the nodes of the planetary gear sets now appear as components of planetary gear sets such as sun gears, ring gears, planet gears and planet gear carriers.

For example, planetary gear set 214 includes sun gear member 214A, planet gear carrier member 214B and ring gear member 214C. The planet gear carrier member 214B rotatably supports a set of planet gears 214D (only one shown) and is connected for common rotation with a first interconnecting shaft or member 244. Sun gear member 214A is connected to the ground or transmission housing 250 through a second interconnecting shaft or member 246. Planet gears 214D are each configured to intermesh with sun gear member 214A and ring gear member 214C. Ring gear member 214C is connected for common rotation with a third interconnecting shaft or member 248.

The input shaft or member 212 is continuously connected to an engine (not shown) or to a turbine of a torque converter (not shown). The output shaft or member 222 is continuously connected with the final drive unit or transfer case (not shown).

Planetary gear set 216 includes sun gear member 216C, planet carrier member 216A that rotatably supports a set of planet gears 216D and ring gear member 216B. Sun gear member 216C is connected for common rotation with a fourth interconnecting shaft or member 252. Planet carrier member 216A is connected for common rotation with a fifth interconnecting shaft or member 254. Planet gears 216D are each configured to intermesh with both sun gear member 216C and ring gear member 216B. Ring gear member 216B is connected for common rotation with a sixth interconnecting shaft or member 256.

Planetary gear set 218 includes sun gear member 218C, ring gear member 218A and planet carrier member 218B that rotatably supports a set of planet gears 218D. Sun gear member 218C is connected for common rotation with a seventh interconnecting shaft or member 258 and fourth interconnecting shaft or member 252. Ring gear member 218A is connected for common rotation with output shaft or member 222. Planet carrier member 218B is connected for common rotation with first interconnecting shaft or member 244 and sixth interconnecting shaft or member 256. Planet gears 218D are each configured to intermesh with both sun gear member 218C and ring gear member 218A.

Planetary gear set 220 includes sun gear member 220C, ring gear member 220A and planet carrier member 220B that rotatably supports a first set of planet gears 220D and a second set of planet gears 220E. Sun gear member 220C is connected for common rotation with input shaft or member 212. Ring gear member 220A is connected for common rotation with an eighth interconnecting shaft or member 260 and a ninth interconnecting shaft or member 262. Planet carrier member 220B is connected for common rotation with a tenth interconnecting shaft or member 264 and an eleventh interconnecting shaft or member 266. First set of planet gears 220D are configured to intermesh with both sun gear member 220C and second set of planet gears 220E. Second set of planet gears 220E are configured to intermesh with both ring gear member 220A and first set of planet gears 220D.

The torque-transmitting mechanisms or clutches 226, 228, 230, 232 and brake 234 allow for selective interconnection of the shafts or interconnecting members, members of the planetary gear sets and the housing. For example, first clutch 226 is selectively engageable to connect third interconnecting shaft or member 248 and ninth interconnecting shaft or member 262. Second clutch 228 is selectively engageable to connect seventh interconnecting shaft or member 258 to eighth interconnecting shaft or member 260. Third clutch 230 is selectively engageable to connect tenth interconnecting shaft or member 264 to seventh interconnecting shaft or member 258. Fourth clutch 232 is selectively engageable to connect input shaft or member 212 to fifth interconnecting shaft or member 254. Brake 234 is selectively engageable to connect eleventh interconnecting shaft or member 266 to transmission housing 250 to restrict rotation of shaft or member 266 relative to housing 250.

Figure 9:
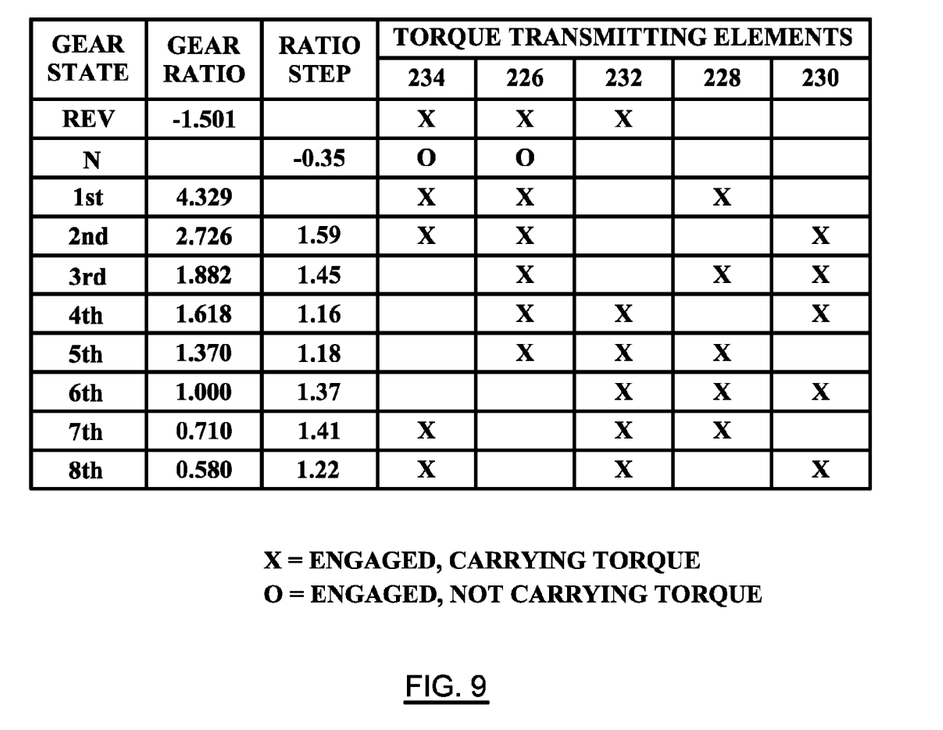
FIG. 9 is a truth table presenting the state of engagement of the various torque transmitting clutches and brakes in each of the available forward and reverse speeds or gear ratios of the automatic transmission illustrated in FIGS. 7 and 8.

Referring now to FIGS. 8 and 9, the operation of the embodiment of the eight speed automatic transmission 200 will be described. It will be appreciated that the automatic transmission 200 is capable of transmitting torque from the input shaft or member 212 to the output shaft or member 222 in at least eight forward speed or torque ratios and at least one reverse speed or torque ratio. Each forward and reverse speed or torque ratio is attained by engagement of one or more of the torque-transmitting mechanisms (i.e. first clutch 226, second clutch 228, third clutch 230, fourth clutch 232 and brake 234), as will be explained below. FIG. 9 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 200. An example of the gear ratios that may be obtained using the embodiments of the present invention are also shown in FIG. 9. Of course, other gear ratios are achievable depending on the gear diameter, gear teeth count and gear configuration selected.

To establish reverse gear, first clutch 226, fourth clutch 232 and brake 234 are engaged or activated. First clutch 226 connects third interconnecting shaft or member 248 and ninth interconnecting shaft or member 262. Fourth clutch 232 connects input shaft or member 212 to fifth interconnecting shaft or member 254. Brake 234 connects eleventh interconnecting shaft or member 266 to transmission housing 250 to restrict rotation of shaft or member 266 relative to housing 250. Likewise, the eight forward ratios are achieved through different combinations of clutch engagement, as shown in FIG. 9.

It will be appreciated that the foregoing explanation of operation and gear states of the eight speed automatic transmission 200 assumes, first of all, that all clutches and brake not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first interconnecting member continuously interconnecting the first member of the first planetary gear set with a stationary element;
   a second interconnecting member continuously interconnecting the second member of the first planetary gear set with the third member of the third planetary gear set and the third member of the second planetary gear set;
   a third interconnecting member continuously interconnecting the second member of the third planetary gear set with the second member of the second planetary gear set; and
   five torque transmitting mechanisms each selectively engageable to interconnect at least one of the first members, second members, and third members with at least one of the first members, second members, third members, and the stationary element; and
   wherein the torque transmitting mechanisms are selectively engageable in combinations of at least three to establish at least eight forward speed ratios and at least one reverse speed ratio between the input member and the output member.

2. The transmission of claim 1 wherein the first members are sun gears, the second members are carrier members, and the third members are ring gears.

3. The transmission of claim 1 wherein the input member is continuously interconnected with the first member of the fourth planetary gear set and the output member is continuously interconnected with the first member of the third planetary gear set.

4. The transmission of claim 1 wherein the first member of the first planetary gear set is a ring gear, the second member of the first planetary gear set is a carrier member, the third member of the first planetary gear set is a sun gear, the first member of the second planetary gear set is a sun gear, the second member of the second planetary gear set is a carrier member, the third member of the second planetary gear set is a ring gear, the first member of the third planetary gear set is sun gear, the second member of the third planetary gear set is a ring gear, the third member of the third planetary gear set is a carrier member, the first member of the fourth planetary gear set is a ring gear, the second member of the fourth planetary gear set is a carrier member, and the third member of the fourth planetary gear set is a sun gear.

5. The transmission of claim 1 wherein the input member is continuously interconnected with the second member of the fourth planetary gear set and the output member is continuously interconnected with the second member of the second planetary gear set.

6. The transmission of claim 1 wherein the first member of the first planetary gear set is a sun gear, the second member of the first planetary gear set is a carrier member, the third member of the first planetary gear set is a ring gear, the first member of the second planetary gear set is a carrier member, the second member of the second planetary gear set is a sun gear, the third member of the second planetary gear set is a ring gear, the first member of the third planetary gear set is a ring gear, the second member of the third planetary gear set is a sun gear, the third member of the third planetary gear set is a carrier member, the first member of the fourth planetary gear set is a ring gear, the second member of the fourth planetary gear set is a carrier member, and the third member of the fourth planetary gear set is a sun gear.

7. The transmission of claim 1 wherein the input member is continuously interconnected with the third member of the fourth planetary gear set and wherein the output member is continuously interconnected with the first member of the third planetary gear set.

8. The transmission of claim 1 wherein a first of the five torque transmitting mechanisms is selectively engageable to interconnect at least one of the first member of the fourth planetary gear set and the input member with at least one of the second member of the second planetary gear set and the second member of the third planetary gear set.

9. The transmission of claim 8 wherein a second of the five torque transmitting mechanisms is selectively engageable to interconnect the third member of the fourth planetary gear set with the first member of the second planetary gear set.

10. The transmission of claim 9 wherein a third of the five torque transmitting mechanisms is selectively engageable to interconnect the second member of the fourth planetary gear set with the first member of the second planetary gear set.

11. The transmission of claim 10 wherein a fourth of the five torque transmitting mechanisms is selectively engageable to interconnect the third member of the fourth planetary gear with the third member of the first planetary gear set.

12. The transmission of claim 11 wherein a fifth of the five torque transmitting mechanisms is selectively engageable to interconnect the second member of the fourth planetary gear set with the stationary element.

13. The transmission of claim 1 wherein a first of the five torque transmitting mechanisms is selectively engageable to interconnect at least one of the second member of the fourth planetary gear set and the input member with the first member of the second planetary gear set.

14. The transmission of claim 13 wherein a second of the five torque transmitting mechanisms is selectively engageable to interconnect the first member of the fourth planetary gear set with the first member of the second planetary gear set.

15. The transmission of claim 14 wherein a third of the five torque transmitting mechanisms is selectively engageable to interconnect the first member of the fourth planetary gear set with the first member of the third planetary gear set.

16. The transmission of claim 15 wherein a fourth of the five torque transmitting mechanisms is selectively engageable to interconnect the third member of the fourth planetary gear set with the third member of the first planetary gear set.

17. The transmission of claim 16 wherein a fifth of the five torque transmitting mechanisms is selectively engageable to interconnect the third member of the fourth planetary gear set with the stationary element.

18. The transmission of claim 1 wherein a first of the five torque transmitting mechanisms is selectively engageable to interconnect the third member of the first planetary gear set with the first member of the fourth planetary gear set.

19. The transmission of claim 18 wherein a second of the five torque transmitting mechanisms is selectively engageable to interconnect the first member of the fourth planetary gear set with the second member of the third planetary gear set.

20. The transmission of claim 19 wherein a third of the five torque transmitting mechanisms is selectively engageable to interconnect the second member of the fourth planetary gear set with the second member of the third planetary gear set.

21. The transmission of claim 20 wherein a fourth of the five torque transmitting mechanisms is selectively engageable to interconnect at least one of the third member of the fourth planetary gear set and the input member with the first member of the second planetary gear set.

22. The transmission of claim 21 wherein a fifth of the five torque transmitting mechanisms is selectively engageable to interconnect the second member of the fourth planetary gear set with the stationary element.

23. A transmission comprising:

an input member;

an output member;

first, second, third and fourth planetary gear sets each having first, second and third members, wherein the input member is continuously interconnected with the first member of the fourth planetary gear set and the output member is continuously interconnected with the first member of the third planetary gear set;

a first interconnecting member continuously interconnecting the first member of the first planetary gear set with a stationary element;

a second interconnecting member continuously interconnecting the second member of the first planetary gear set with the third member of the third planetary gear set and the third member of the second planetary gear set;

a third interconnecting member continuously interconnecting the second member of the third planetary gear set with the second member of the second planetary gear set;

a first torque transmitting mechanism selectively engageable to interconnect at least one of the first member of the fourth planetary gear set and the input member with at least one of the second member of the second planetary gear set and the second member of the third planetary gear set;

a second torque transmitting mechanism selectively engageable to interconnect the third member of the fourth planetary gear set with the first member of the second planetary gear set;

a third torque transmitting mechanism selectively engageable to interconnect the second member of the fourth planetary gear set with the first member of the second planetary gear set;

a fourth torque transmitting mechanism selectively engageable to interconnect the third member of the fourth planetary gear with the third member of the first planetary gear set; and a fifth torque transmitting mechanism selectively engageable to interconnect the second member of the fourth planetary gear set with the stationary element, and wherein the torque transmitting mechanisms are selectively engageable in combinations of at least three to establish at least eight forward speed ratios and at least one reverse speed ratio between the input member and the output member.

24. The transmission of claim 23 wherein the first members are sun gears, the second members are carrier members, and the third members are ring gears.

25. A transmission comprising:

an input member;

an output member;

first, second, third and fourth planetary gear sets each having a sun gear, a carrier member, and a ring gear, wherein the input member is continuously interconnected with the sun gear of the fourth planetary gear set and the output member is continuously interconnected with the sun gear of the third planetary gear set;

a first interconnecting member continuously interconnecting the sun gear of the first planetary gear set with a stationary element;

a second interconnecting member continuously interconnecting the carrier member of the first planetary gear set with the ring gear of the third planetary gear set and the ring gear of the second planetary gear set;

a third interconnecting member continuously interconnecting the carrier member of the third planetary gear set with the carrier member of the second planetary gear set;

a first torque transmitting mechanism selectively engageable to interconnect at least one of the sun gear of the fourth planetary gear set and the input member with at least one of the carrier member of the second planetary gear set and the carrier member of the third planetary gear set;

a second torque transmitting mechanism selectively engageable to interconnect the ring gear of the fourth planetary gear set with the sun gear of the second planetary gear set;

a third torque transmitting mechanism selectively engageable to interconnect the carrier member of the fourth planetary gear set with the sun gear of the second planetary gear set;

a fourth torque transmitting mechanism selectively engageable to interconnect the ring gear of the fourth planetary gear with the ring gear of the first planetary gear set; and a fifth torque transmitting mechanism selectively engageable to interconnect the carrier member of the fourth planetary gear set with the stationary element, and wherein the torque transmitting mechanisms are selectively engageable in combinations of at least three to establish at least eight forward speed ratios and at least one reverse speed ratio between the input member and the output member.

26. A transmission comprising:

an input member;

an output member;

first, second, third and fourth planetary gear sets each having first, second and third members, wherein the input member is continuously interconnected with the second member of the fourth planetary gear set and the output member is continuously interconnected with the second member of the second planetary gear set;

a first interconnecting member continuously interconnecting the first member of the first planetary gear set with a stationary element;

a second interconnecting member continuously interconnecting the second member of the first planetary gear set with the third member of the third planetary gear set and the third member of the second planetary gear set;

a third interconnecting member continuously interconnecting the second member of the third planetary gear set with the second member of the second planetary gear set;

a first torque transmitting mechanism selectively engageable to interconnect at least one of the second member of the fourth planetary gear set and the input member with the first member of the second planetary gear set;

a second torque transmitting mechanism selectively engageable to interconnect the first member of the fourth planetary gear set with the first member of the second planetary gear set;

a third torque transmitting mechanism selectively engageable to interconnect the first member of the fourth planetary gear set with the first member of the third planetary gear set;

a fourth torque transmitting mechanism selectively engageable to interconnect the third member of the fourth planetary gear set with the third member of the first planetary gear set; and a fifth torque transmitting mechanism selectively engageable to interconnect the third member of the fourth planetary gear set with the stationary element, and wherein the torque transmitting mechanisms are selectively engageable in combinations of at least three to establish at least eight forward speed ratios and at least one reverse speed ratio between the input member and the output member.

27. The transmission of claim 26 wherein the first member of the first planetary gear set is a ring gear, the second member of the first planetary gear set is a carrier member, the third member of the first planetary gear set is a sun gear, the first member of the second planetary gear set is a sun gear, the second member of the second planetary gear set is a carrier member, the third member of the second planetary gear set is a ring gear, the first member of the third planetary gear set is a sun gear, the second member of the third planetary gear set is a ring gear, the third member of the third planetary gear set is a carrier member, the first member of the fourth planetary gear set is a ring gear, the second member of the fourth planetary gear set is a carrier member, and the third member of the fourth planetary gear set is a sun gear.

28. A transmission comprising:

an input member;

an output member;

first, second, third and fourth planetary gear sets each having a sun gear, a carrier member, and a ring gear wherein the input member is continuously interconnected with the carrier member of the fourth planetary gear set and the output member is continuously interconnected with the carrier member of the second planetary gear set;

a first interconnecting member continuously interconnecting the ring gear of the first planetary gear set with a stationary element;

a second interconnecting member continuously interconnecting the carrier member of the first planetary gear set with the carrier member of the third planetary gear set and with the ring gear of the second planetary gear set;

a third interconnecting member continuously interconnecting the ring gear of the third planetary gear set with the carrier member of the second planetary gear set;

a first torque transmitting mechanism selectively engageable to interconnect at least one of the carrier member of the fourth planetary gear set and the input member with the sun gear of the second planetary gear set;

a second torque transmitting mechanism selectively engageable to interconnect the ring gear of the fourth planetary gear set with the sun gear of the second planetary gear set;

a third torque transmitting mechanism selectively engageable to interconnect the ring gear of the fourth planetary gear set with the sun gear of the third planetary gear set;

a fourth torque transmitting mechanism selectively engageable to interconnect the sun gear of the fourth planetary gear set with the sun gear of the first planetary gear set; and a fifth torque transmitting mechanism selectively engageable to interconnect the sun gear of the fourth planetary gear set with the stationary element, and wherein the torque transmitting mechanisms are selectively engageable in combinations of at least three to establish at least eight forward speed ratios and at least one reverse speed ratio between the input member and the output member.

29. A transmission comprising:

an input member;

an output member;

first, second, third and fourth planetary gear sets each having first, second and third members, wherein the input member is continuously interconnected with the third member of the fourth planetary gear set and wherein the output member is continuously interconnected with the first member of the third planetary gear set;

a first interconnecting member continuously interconnecting the first member of the first planetary gear set with a stationary element;

a second interconnecting member continuously interconnecting the second member of the first planetary gear set with the third member of the third planetary gear set and the third member of the second planetary gear set;

a third interconnecting member continuously interconnecting the second member of the third planetary gear set with the second member of the second planetary gear set;

a first torque transmitting mechanism selectively engageable to interconnect the third member of the first planetary gear set with the first member of the fourth planetary gear set;

a second torque transmitting mechanism selectively engageable to interconnect the first member of the fourth planetary gear set with the second member of the third planetary gear set;

a third torque transmitting mechanism selectively engageable to interconnect the second member of the fourth planetary gear set with the second member of the third planetary gear set;

a fourth torque transmitting mechanism selectively engageable to interconnect at least one of the third member of the fourth planetary gear set and the input member with the first member of the second planetary gear set; and a fifth torque transmitting mechanism selectively engageable to interconnect the second member of the fourth planetary gear set with the stationary element, and wherein the torque transmitting mechanisms are selectively engageable in combinations of at least three to establish at least eight forward speed ratios and at least one reverse speed ratio between the input member and the output member.

30. The transmission of claim 29 wherein the first member of the first planetary gear set is a sun gear, the second member of the first planetary gear set is a carrier member, the third member of the first planetary gear set is a ring gear, the first member of the second planetary gear set is a carrier member, the second member of the second planetary gear set is a sun gear, the third member of the second planetary gear set is a ring gear, the first member of the third planetary gear set is a ring gear, the second member of the third planetary gear set is a sun gear, the third member of the third planetary gear set is a carrier member, the first member of the fourth planetary gear set is a ring gear, the second member of the fourth planetary gear set is a carrier member, and the third member of the fourth planetary gear set is a sun gear.

31. A transmission comprising:

an input member;

an output member;

first, second, third and fourth planetary gear sets each having a sun gear, a carrier member, and a ring gear, wherein the input member is continuously interconnected with the sun gear of the fourth planetary gear set and wherein the output member is continuously interconnected with the ring gear of the third planetary gear set;

a first interconnecting member continuously interconnecting the sun gear of the first planetary gear set with a stationary element;

a second interconnecting member continuously interconnecting the carrier member of the first planetary gear set with the carrier member of the third planetary gear set and the ring gear of the second planetary gear set;

a third interconnecting member continuously interconnecting the sun gear of the third planetary gear set with the sun gear of the second planetary gear set;

a first torque transmitting mechanism selectively engageable to interconnect the ring gear of the first planetary gear set with the ring gear of the fourth planetary gear set;

a second torque transmitting mechanism selectively engageable to interconnect the ring gear of the fourth planetary gear set with the sun gear of the third planetary gear set;

a third torque transmitting mechanism selectively engageable to interconnect the carrier member of the fourth planetary gear set with the sun gear of the third planetary gear set;

a fourth torque transmitting mechanism selectively engageable to interconnect at least one of the sun gear of the fourth planetary gear set and the input member with the carrier member of the second planetary gear set; and a fifth torque transmitting mechanism selectively engageable to interconnect the carrier member of the fourth planetary gear set with the stationary element, and wherein the torque transmitting mechanisms are selectively engageable in combinations of at least three to establish at least eight forward speed ratios and at least one reverse speed ratio between the input member and the output member.

* * * * *